United States Patent
Pabich et al.

[15] 3,693,220
[45] Sept. 26, 1972

[54] WING HEADED FASTENERS AND PROCESS FOR ATTACHING SAME

[72] Inventors: Richard W. Pabich, c/o Acme-Lane Co., 4904 W. Fullerton, Chicago, Ill. 60639; Richard W. Treiber, deceased, late of 1340 Sherwood Road, Glenview, Ill. 60025 by E. Louise Treiber, executrix

[22] Filed: July 23, 1970

[21] Appl. No.: 63,984

Related U.S. Application Data

[60] Division of Ser. No. 800,362, Feb. 12, 1969, Pat. No. 3,612,378, and a continuation-in-part of Ser. No. 615,830, Feb. 13, 1967, abandoned, and a continuation-in-part of Ser. No. 689,939, Nov. 24, 1967, Pat. No. 3,429,013, and a continuation-in-part of Ser. No. 777,652, Nov. 21, 1968.

[52] U.S. Cl....................24/221 R, 85/28, 227/107, 292/218
[51] Int. Cl..........A44b 17/00, B25c 3/00, B27f 7/00
[58] Field of Search...24/221 L, 221 R, 73 RM, 73 PM, 24/90 W, 90 PR, 221; 206/56 DF, 56 AB; 292/202, 218; 85/10 R, 28; 227/107

[56] References Cited

UNITED STATES PATENTS

| | | | |
|---|---|---|---|
| 1,102,871 | 7/1914 | Carroll | 85/28 X |
| 1,115,489 | 11/1914 | Bennett | 24/221 R |
| 1,326,962 | 1/1920 | Poindexter | 85/10 R UX |
| 1,686,252 | 10/1928 | Pope | 227/107 |
| 2,093,261 | 9/1937 | Willson | 85/28 X |
| 3,123,389 | 3/1964 | Biesecker | 292/218 |
| 3,165,968 | 1/1965 | Anstett | 85/28 X |
| 3,285,404 | 11/1966 | Spinney | 24/16 PB UX |

FOREIGN PATENTS OR APPLICATIONS

| | | | |
|---|---|---|---|
| 1,032,624 | 6/1966 | Great Britain | 24/73 SB |

*Primary Examiner*—Donald A. Griffin
*Attorney*—Alter, Weiss & Whitesel

[57] ABSTRACT

The invention provides (a) a strip of wing headed fasteners integrally interconnected by means of a thin web and (b) a method of using the strip. These strips are inserted into a magazine in air tools that force nails therein. Uniquely formed wing headed fasteners and tool attachments are correspondingly adapted to each other to enable the wing headed fasteners to be pivotally mounted to said members with the nails from the tool for releasably holding a first member, such as a cabinet backing in a position relative to a second member such as a cabinet frame therebehind.

10 Claims, 18 Drawing Figures

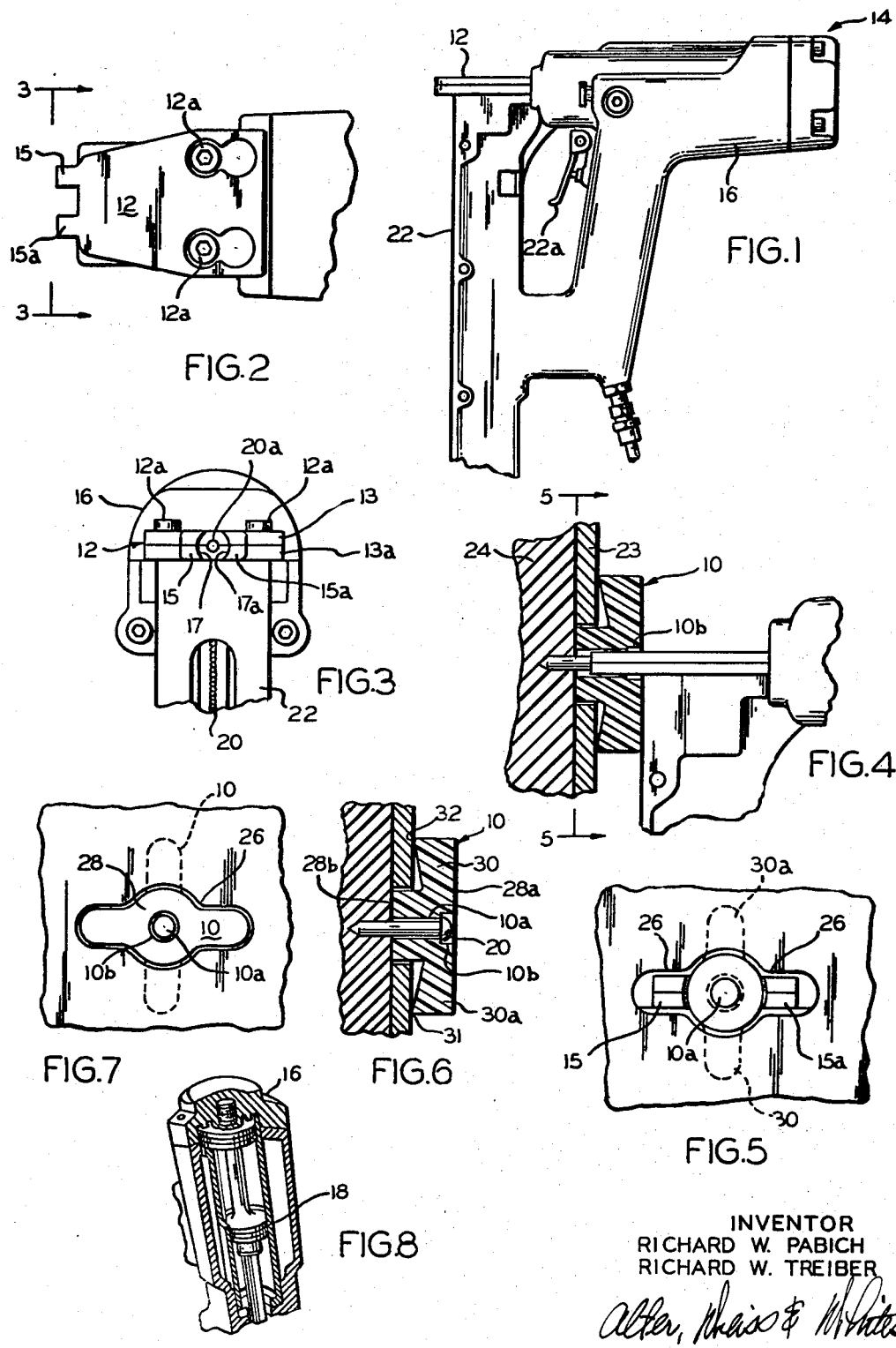

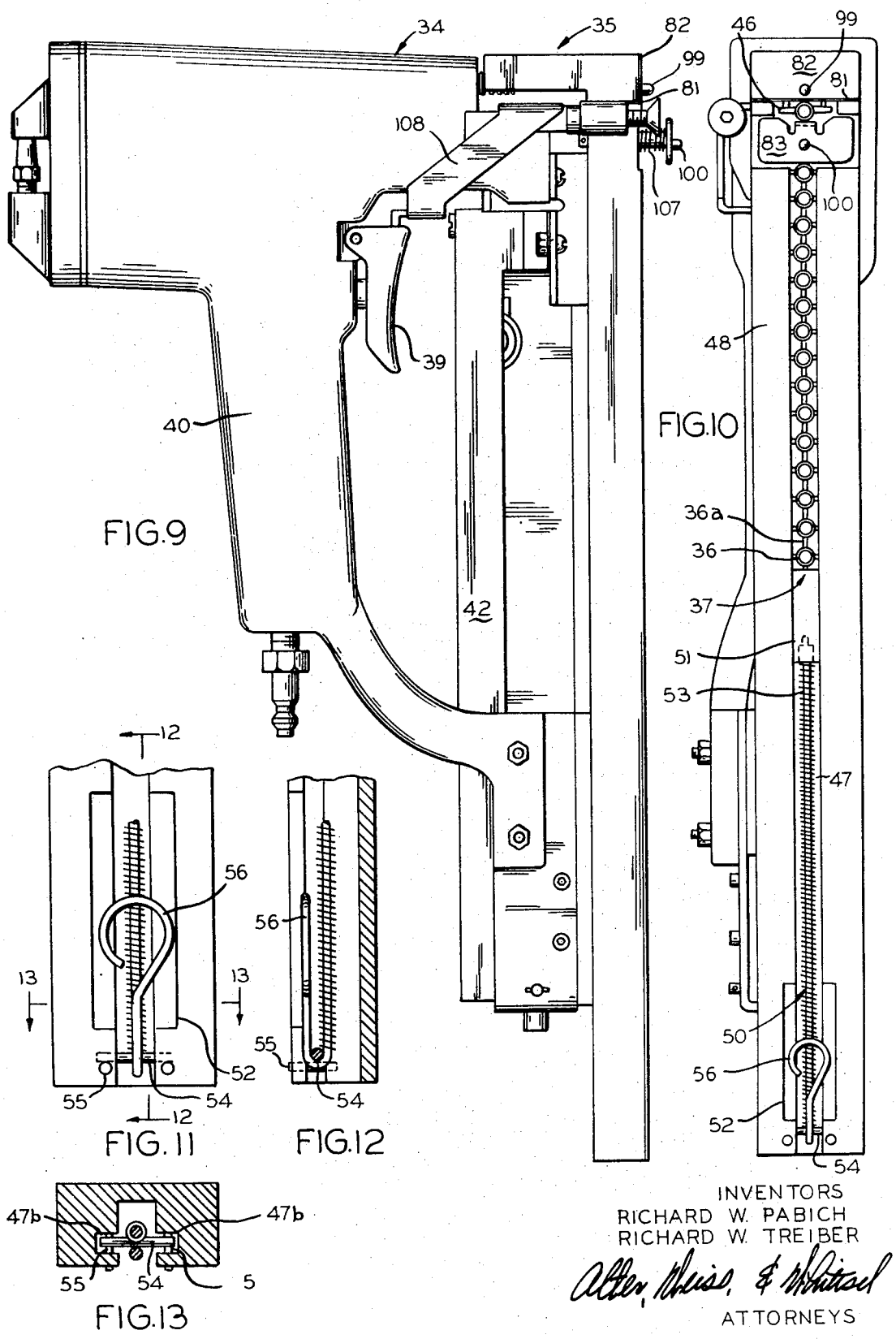

INVENTORS
RICHARD W. PABICH
RICHARD W. TREIBER

ATTORNEYS

WING HEADED FASTENERS AND PROCESS FOR ATTACHING SAME

This is a divisional application of Ser. No. 800,362 filed Feb. 12, 1969, and now U.S. Pat. No. 3,612,378 entitled Wing-Headed Fasteners and Tool Attachment for Applying Fastener. This is a continuation-in-part of our previously filed and since abandoned patent application entitled "IMPROVED WING HEADED FASTENER AND TOOL ATTACHMENT FOR APPLYING FASTENER," Ser. No. 615,830, filing date Feb. 13, 1967, as well as our previously filed continuation-in-part applications entitled "WING HEADED FASTENER AND METHOD FOR APPLYING," Ser. No. 689,939, filed Nov. 24, 1967, now U.S. Pat. No. 3,429,013, issued Feb. 25, 1969, and "TOOL FOR IMPROVED WING HEADED FASTENER," Ser. No. 777,652, filed Nov. 21, 1968.

This invention relates to improved wing headed fasteners and tool attachments for applying the wing headed fasteners with a minimum of cost and time.

For many years the electronics industry, among others, has been faced with the problem of reassembling imperfect units such as television sets after the same have been assembled. Of principal concern is the necessity of removing and thereafter replacing threaded fasteners which are normally used in fastening the backing members of television cabinets, or the like. The cost involved in the operation adds considerably to the unit cost of the product being manufactured and thus there is a definite need for obviating the removal and replacement of the threaded fasteners.

Several attempts have been made in the past to remedy this problem by using fasteners which do not have to be removed from the cabinet in order to enable removal of the cabinet backings which they secure. Such fasteners do exist and although they obviate problems of removal, it is more difficult to install these new fasteners than it is to install the old and well known threaded fasteners.

As explained in our previous applications, we have obviated the disadvantages attendant with utilizing common threaded fasteners for securing first members, such as cabinet backing members, to second members, such as cabinets, by providing fasteners which enable the backing of a cabinet to be removed expeditiously and without removal of the fasteners. In addition, the fasteners can be positioned and applied automatically with our new tools and processed thereby obviating the difficulties involved with initially applying or installing the fasteners. It was thus a primary object of our invention covered under U.S. Pat No. 3,429,013 to provide new and improved fasteners which can removably associate a cabinet backing or the like, with a cabinet so that the backing can be assembled and disassembled with a minimum amount of time and effort. It was a further object of this invention to provide new and improved fasteners that removably associate a cabinet backing, or the like, with a second member such as a cabinet in order that the backing can be removed from the cabinet without removal of said fastener.

It is an object of our invention to provide new and improved fasteners and the attachments for an air tool to thereby adapt the tool especially for our new and improved fasteners. The attachments enable our new and improved fasteners to be associated with members at a predetermined location with respect to key slots in those members.

It is even still further an object of this invention to provide new and improved systems for positioning fasteners such as described herein with respect to nail driving tools in order to associate the fasteners with members by driving nails therethrough.

While we previously disclosed interconnected fasteners of the type described, as well as attachments with automatic nailing tools that provided automatic means for successively severing each of the fastenes after they are positioned for fastening by the nails as explained in our previous patent applications, an improved mode of interconnecting and of severing of the interconnecting or gate portions of the fasteners is described herein. Also, the tops and bottoms of the fasteners were not formed for maximum efficiency from the standpoint of both receiving the nails as well as from the standpoint of operation after the nails were driven through the fasteners.

Thus, we have provided an improved interconnecting system for the wing headed fasteners, as well as a means and method of severing the interconnected fasteners more adroitly then previously.

Other and further objects of this invention will become readily apparent from reading the description in light of the accompanying drawings wherein:

FIG. 1 is a side elevational view illustrating our invention used with an automatic nailing tool that is powered by compressed air;

FIG. 2 is a front view of a portion of the tool attachment of our invention illustrating its mode of association with the automatic nailing tool of FIG. 1;

FIG. 3 is a bottom view looking in the direction of the arrows 3—3 of FIG. 2 at the portion of that tool attachment of our invention;

FIG. 4 is a sectional view illustrating how a nail fastener is forced through one of our new and improved wing headed fasteners to secure the same fastener and therefore a first member such as a cabinet backing to a second members, such as a cabinet frame;

FIG. 5 is a sectional view taken along a plane passing through the lines 5—5 in FIG. 4 and looking in the direction of the arrows to illustrate how the tool attachment of the first mentioned application cooperates with a key slot to locate the wing headed fastener and nail in a certain position relative to said key slot;

FIG. 6 is a sectional view similar to FIG. 4 illustrating how our new and improved wing headed fastener is held in position with the wing head substantially transverse to the key slot with its wing portions forced against the backing surface by a nail;

FIG. 7 is a view illustrating our new and improved wing headed fastener in relation to the key slot in the cabinet backing where the wing headed fastener has an open position (shown by the solid lines) and a closed position (shown in phantom); and FIG. 8 is a cut-away view of the actuating piston member of the air tool illustrated in FIG. 1;

FIG. 9 is a side elevational view illustrating an embodiment of our invention of this application with an automatic nailing tool where the improved fastener is illustrated in a spaced apart interconnected relationship;

FIG. 10 is a bottom view of the automatic nailing tool with the tool attachment of FIG. 9;

FIG. 11 is an enlarged fragmentary view of the bottom of the tool attachment of FIG. 10;

FIG. 12 is a sectional view of FIG. 11 taken along a plane passing through the lines 12—12 and looking in the direction of the arrows;

FIG. 13 is a sectional view of FIG. 11 taken on a plane passing through the line 13—13 and looking in the direction of the arrows in FIG. 11;

Figure 14:
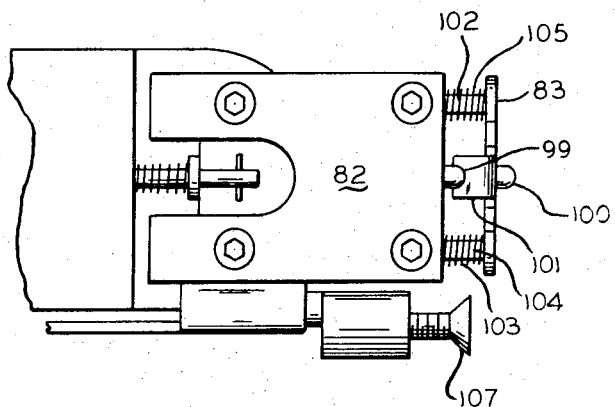
FIG. 14 is a fragmentary front view of FIG. 9 showing a portion of the tool attachment.

Referring to the drawings, wherein like characters of reference indicate corresponding parts throughout, our new and improved wing headed fastener 10 and tool attachment 12 are shown in FIGS. 1-8 in connection with an air tool which is commonly used for driving nails. Exemplary embodiments thereof have heretofore been illustrated and described in U.S. Pat. Nos. 2,872,901, 3,081,741, 3,081,742, 3,056,964, 3,056,965 and in the previously mentioned applications for Letters Patent.

As illustrated in FIGS. 1, 3 and 8, the air tool 14 has a cylinder head 16 that is supplied with compressed air to drive a reciprocating piston 18 in order that nails 20 which are held in the magazine 22 thereof are forced through an aperture 20a in the tool attachment 12. It will be noted that the tool attachment 12 is associated with the lower portion of the air tool 14 by fastening members 12a. The tool attachment 12 comprises a pair of apertured plates 13, 13a. The plates are contiguously positioned and form the aperture 20a therebetween for purposes of enabling the nails 20 in the magazine 22 to be forced therethrough by the piston 18 upon actuation of the trigger 22a of the air tool 14. The attachment 12 has a pair of spaced apart noses 15, 15a, which have inner sides with opposing arcuate edges 17, 17a to receive and hold the wing headed fasteners 10 in position in connection with the air tool 14.

The wing headed fasteners 10, as illustrated in FIGS. 4-7, are intended for use in cooperation with a first member, such as a cabinet backing 23 to removably associate the backing with a second member such as a cabinet 24 in order that when it is desired to remove the cabinet backing, the same can be removed without removing the fasteners. The first member or cabinet backing 23 has a key slot 26 which substantially conforms to a cross-section of our new and improved wing headed fastener 10 as illustrated in FIG. 7.

As illustrated in FIGS. 6 and 7, the wing headed wing headed fastener 10 has a central body portion 28 with top and bottom ends 28a, 28b, respectively. A pair of wing portions 30, 30a, project from the central body portion in opposite directions. The wing portions preferably have flat upper ends and inclined lower ends 31, 32 having the lowest points thereof at the outside and rising upwardly at points closer to the central axis thereof. The wing portions 30, 30a are preferably composed of resilient material such as plastic and the lowest points thereof are accordingly deflected upward toward the top end of said wing headed fastener when forced against the cabinet backing 23. Such deflection causes pressure to be exerted on the surface underneath the fastener to secure the fastener and fastened member.

It will be noted from FIGS. 4 and 6 that the lower ends of the wing portions 30, 30a are rounded so that when it is desired to rotate the fastener, friction is minimized. Also, the central body portion 28 has an opening 10a with a recess 10b formed therein through the central axis thereof from the top to the bottom for receiving a nail 20 in order to attach the wing headed fastener 10 to the said second member.

In operation, the air tool 14 of the above first filed application, with its magazine filled with nails 20 has an improved wing headed fastener 10 releasably held by the attachment 12 as illustrated in FIG. 5. The central body portion 28 of the fastener 10 is held by the arcuate edges 17, 17a so that the aperture 10a in the wing headed fastener 10 is aligned with the intended path of nails 20. Thereafter the noses 15, 15a of the tool attachment 12 are positioned in the key slot 26, as illustrated in FIG. 5 in order that the wing headed fastener has its wing portions 30, 30a positioned substantially transverse to the key slot 26 and therefore in contact with the backing member 23 of the cabinet 24. Thus, when the air tool 14 is actuated a nail 20 is forced through the aperture 20a, the aperture 10a of the wing headed fastener 10 and finally into engagement with the cabinet 24 as illustrated in FIGS. 4 and 6. When a nail 20 is driven through a wing headed fastener 10, it is attached to the cabinet 24. When the tool is lifted away from engagement with the cabinet back, the wing headed fastener slides free of the arcuate edges 17, 17a.

The wing headed fastener's open and closed positions are illustrated in FIGS. 5 and 7. In FIG. 7, the wing headed fastener is in its open position and is in alignment with the key slot 26 in order that the backing 23 can be removed from the cabinet without removing the fastener 10. The wing headed fastener's closed position is illustrated in phantom in FIG. 5 and 7 where the wing portions thereof are in contact with the backing of the cabinet in a substantially transverse position with respect to the key slot in order to secure the backing 23 to the cabinet 24. It will be further noted that in order to enable easy rotation of the wing headed fasteners, the nails 20 are driven into the cabinet a predetermined distance which gives optimum pressure on the wing headed fastener in addition to allowing selected rotation thereof, when this is desired.

In FIGS. 9-14 the improved embodiments of wing headed fasteners and tool attachments are shown. Therein, an automatic nailing tool 34 is illustrated in combination with a series of fasteners 36 which form a strip 37 and are interconnected by means of interconnecting portions or gates 36a. By being interconnected, the wing headed fasteners 36 can be automatically moved to a position where they can be simultaneously separated from each other and applied rapidly and efficiently in holding the members together, as will be explained hereafter.

The nailing tool 34 is patterned after the conventional nailers illustrated in the aforementioned patents and patent applications and described in connection with FIGS. 1–8. The air tool is provided with an actuation trigger 39 and a handle 40. A tool attachment 35 is added to tool 34 and includes a nail magazine 42 with nails (not shown) positioned therein in order that they can be driven through the mouth of the tool.

Figure 15:
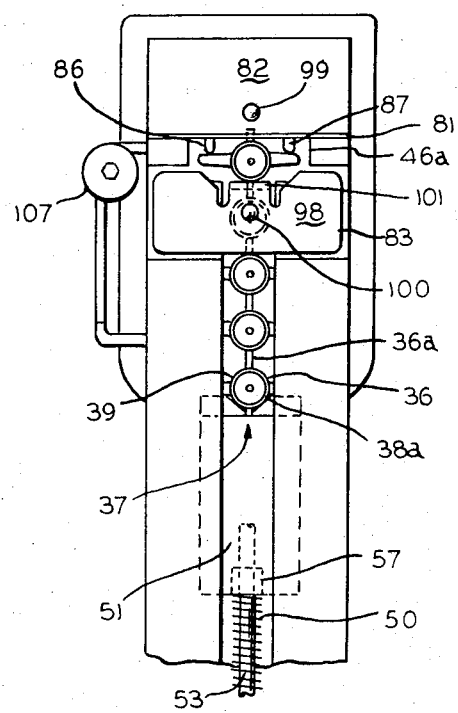
FIG. 15 is a fragmentary view of the bottom of FIG. 9 showing a portion of the tool attachment.

At the bottom of the tool is an aperture 46 which is shaped to allow the sides of the wing headed fasteners to move from the tool after the fasteners have been severed and fastened to a member. For convenience of expression, the aperture 46 is hereinafter called a "characterized aperture", which implies that the shape of the aperture corresponds to the shape of the fastener. This aperture is best seen in FIG. 15 where it is defined in the front by the pins 86, 87 and in the back by the forward shoulders 86a, 87a of the magazine. The aperture 46 feeds into a channel 47 which is formed in the wing headed fastener magazine 48. The channel 47 includes undercut slots 47b for receiving the wings 30, 30a of the fasteners to thus slidably receive and capture the strip 37 in the channel 47. The strip 37 of the fasteners 36 are spring biased on one end by the spring means 50 and are stopped at the front end by a first cut-off means 81. The first cut-off means is sandwiched between a fastener plate 82 and magazine 48. A second cut-off means 83 is located proximate to the fasteners at the front end of the strip of fasteners and enables each of the individual fasteners 36 to be severed after they are positioned for fastening by the nails as will be explained hereafter.

The channel 47 which with undercut slots 47b is shaped in conformity to the cross-section of the fasteners as illustrated in FIG. 13 has an opening 52 proximate to the rear end thereof which accepts the strip of fasteners 36 upon their insertion therein.

The spring means 50 has a front or pusher member 51 attached to a retainer shaft member 53 having a rear peg member 54 extending therefrom. The rear peg member is sized so that it can be moved through the opening 52, as well as be slidably received in the slots 47b. The spring means 50 can be held in place at the rear of the machine by the force of the spring pushing member 51 against strip 37 and peg 54, against retaining means such as posts 55. Thus, spring 53 is compressed between pusher 51 and peg 54.

Handle means such as handle 56 is shown as integral to spring retainer shaft 53. It facilitates properly positioning the spring means 50 into an out of the opening 52. The spring retaining shaft slides through journal 57 FIG. 15 so that pusher member 51 rides on the shaft and pushes against the rear end of the strip of fasteners 37, responsive to the exertion of the spring force caused by the compression of the spring 53. The member 51 is slidably contained in groove 47a of channel 47. The wings of the winged fastener also are slidably contained in groove 47a of channel 47. Member 51 is on the same level as the top of the winged fastener, the shaft fits into the groove 47 above the winged fastener. The shaft is shown broken away for convenience; actually it extends almost the entire length of the magazine 48, that is the length of shaft 53 plus the length of member 51 reaches from posts 55 to the characterized aperture 46.

The strip of fasteners is loaded into the machine this way: First, the handle 56 is pulled toward the front of the tool (upwardly as viewed in FIG. 10). The peg 54 is lifted on when it reaches the opening 52. Next, the shaft 53 is pulled toward the back of the tool (downwardly as viewed in FIG. 10). As the shaft is so pulled, the pusher plate 51 is withdrawn through the opening 52. Then the entire assembly of the rod 53, spring 50, peg 54, and pusher plate 51 is entirely separated from the tool.

Next, a strip of fasteners is inserted into channel 47 via the opening 52. The winged heads 30, 30a extend outwardly into channels 47b (FIG. 13), and the central bodies of the fasteners fit into the space between the walls of channel 47. Then, the pusher plate 51 is inserted into opening 52, the shaft 53 passes over the top of the strip fasteners, and the pusher plate 51 abuts against the back of the strip of fasteners. The handle 56 is pulled toward the forward end of the tool (upwardly as viewed in FIG. 10) until the peg 54 clears the back of the opening 52. Then, the peg 54 is pushed down into opening 52 and into channel 47b. The compression of spring 50 pushes the strip of fasteners forward toward the characterized aperture, and the peg 54 is pushed backward against the posts 55.

Figure 16:
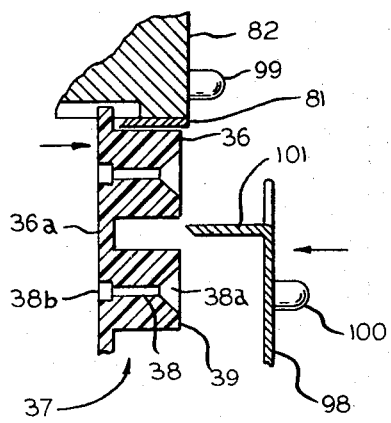
FIG. 16 is a top plan sectional view of FIG. 15 down the center of interconnected fasteners illustrating the improved fasteners and the cutting mechanism of FIG. 9-15 in operation.

Means are provided for cutting and trimming each fastener as it is severed from the strip of fasteners. More particularly, this means comprises fore and aft guillotine blades 81, 101 (FIG. 16). The blade 101 severs the interconnection 36a, and the blade 81 trims off any stub remaining after the blade 101 makes it cut. The blade 81 is a first cut-off means attached to the fastener plate 82 by pins 86, 87 FIG. 15 and cooperates with the characterized aperture 46 to locate the fasteners 36 for activation as illustrated in FIGS. 15 and 16. The exact nature and construction of the pins 86, 87 is not material to the invention. In this particular case, they may be threaded bolts which pass through holes (not shown) in blade 81 and turn into threaded holes (also not shown) in part 82. The heads on these bolts (seen in FIG. 15) secure the blade 81 in place. It will be noted that the second cut-off means 83 has a bottom plate 98 which has a protrusion 100 extending downward therefrom, as well as a cutter 101 extending upward toward the interconnecting gate means 36 a of each of the fasteners 36 positioned in the characterized aperture 46. The cut-off means 82 is spring biased away from the tool by the spring means 102 and 103 which are interposed between the machine and the cut-off means 83 at a location where a pair of reciprocally actuable piston members 104 and 105 extend from the nailing tool. These pistons include central guide pins 104, 105 slidably attached to the tool in any suitable manner and surrounded by bias springs 102, 103. For example, the part 82 may include an enlarged internal bore, and the pins 104, 105 may include enlarged heads which slide in these enlarged bores. Of course, other suitable means may also be provided, such as telescoping posts, for example.

It will be noted that the safety catch 108 of the nailing tool must be completely depressed for the trigger 39 to be actuated. The safety catch 108 is associated with the release lever or piston 107 to enable the trigger 39 when the piston 107 is depressed.

Means are provided for depressing the safety catch when the fastener 36 in aperture 46 is properly positioned relative to the slot in the first member. A protrusion 99 extends from the fastener plate 82 so that it can cooperate with a protrusion 100 extending from cutting means 83 to be constrainingly received in a key slot to locate the improved fasteners 36 in a predetermined location relative to the key slot and to locate the fastener in order that it can be forced against a cabinet backing, or the like, upon actuation of a nail. Thus, when the protrusions 99, 100 are fitted into a slot in a first member and when the wing headed fastener is positioned so that the main body portion thereof is clear of the cutter 101, then the second cutter means 83 and the piston 107 is depressed to enable the trigger 39. More particularly, when piston 107 is depressed, it in turn depresses the safety catch 108, which in turn, through the portion of safety catch 108 (not shown), reaching under the trigger 39, enables the trigger 39, when operated, to press against the pressure valve control button shown immediately beneath the trigger, in any well known manner. If the fastener 36 is not properly positioned in the key slot 26, it will support the tool in a slightly elevated position and, therefore, interfere with the above-described movement of the safety catch 108 mechanism.

As best shown in FIG. 16, the improved wing headed fasteners 36 are joined by gates 36a to form a strip 37. Means are provided at the bottom of the fasteners to obviate the formation of burrs when the nail is driven through the nail receiving opening 38 and to minimize friction when rotating the fastener between the open and the closed positions. More particularly, hole 38 extends into a truncated conically shaped flaring aperture 38a at its bottom. This prevents burrs which may be caused by the nails from extending beyond the bottom of the fastener and also minimizes surface contact with the second member to ridge 39. The top of hole 38 is shown with countersunk portion 38b.

FIG. 16 also shows the positions of the cutters 81, 101. When the protrusions 99, 100 are in the slot 26, the cutting edge of the cutter 101 is contiguous to the gate 36a immediately adjacent the main body section of the fastener 36 that is in characterized aperture 46, since plate 83 is then depressed against springs 104, 105. Similarly, the cutting edge of cutter 81 is contiguous to the remains of the gate that were cut by cutter 101 when the previous fastener 36 was installed. When the nail is forced through hole 38, the fastener strip is forced against the cutter so as to sever the gates.

To review the operation of the tool 34 and attachments thereof, the strip of interconnected fasteners 37 are placed in the slotted magazine compartment 48 and the spring means 50 is urged against the interconnected fasteners 37 to position them successively for activation and fastening. The cut off means 81 and 83 operate to sever and trim each of the fasteners 36 when they are being nailed. As each fastener 36 is nailed, another fastener is actuated by the spring means 50 to a position where it is in the characterized aperture 46 and ready for nailing. The fasteners are located by means of the protrusions 99, 100 as before described.

Figure 17:
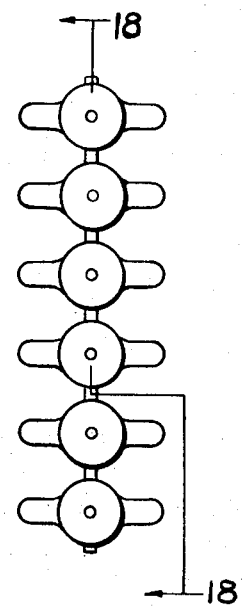
FIG. 17 is a top view of the strip of fasteners which are shown in FIG. 16.
Figure 18:
FIG. 18 is a sectional view of a second embodiment taken along the line 18—18 of FIG. 17 and looking in the direction of the arrows.

FIG. 17 shows a top plan view of a strip of fasteners which might have a cross-section as shown in either FIG. 16 or in FIG. 18. To facilitate a cross referencing between the fasteners of FIGS. 6, 16, and 18, the same reference numerals are used to identify the same parts. The primary difference between the embodiments of FIGS. 16 and 18 resides in the presence or absence of the conical cavity 38a (FIG. 16).

Thus, from an understanding of the operation of our invention it can be seen that the invention has fulfilled the stated objects in a remarkably unexpected fashion. Not only does the new and improved wing headed fastener enable expeditious removal of the cabinet backings, or the like, but also the new and improved attachments and process described herein in connection with the fasteners enables the wing headed fasteners to be installed easily, rapidly and with a minimum of cost.

While we have illustrated preferred embodiments of our invention, the scope thereof is intended to include other embodiments which are suggested by this disclosure. For instance, it is conceivable that other shapes of attachments for associating the wing headed fasteners with driving tools could be employed to achieve the objectives herein disclosed and suggested.

Having thus described our invention, what we claim and desire to secure by United States Letters Patent is:

1. Wing headed fasteners for use in removably attaching first members, such as cabinet backings, to second members, such as cabinets, said fastener comprising a main body portion, said body portion having a top end and a bottom end, at least one integral wing portion made of resilient material and projecting outwardly from said top end of said body portion, said body portion being free of projections between the bottom of said wing portion and the bottom end of said body portion, there being aperture means in said body portion for receiving nails therein to pivotally attach said wing headed fasteners to said second member whereby said fastener may be rotated to removably attach the first members to the second member, and said aperture means comprising a top portion that is countersunk to receive to be contiguous with the received nail and a bottom portion that is countersunk to reduce the area of contact and therefore the friction between the bottom end of said fastener and said second member.

2. A wing headed fastener for use in removably attaching first members, such as cabinet backings, to second members, such as cabinets, means integral to said wing headed fasteners for inter-connecting said wing headed fasteners in strips in a spaced apart relationship so that said wing headed fasteners can be fed for successive fastening by tools that automatically drive nails, said fastener comprising a main body portion, said body portion having a top end and a bottom end, at least one wing portion projecting outwardly from said top end of said body portion, said body portion having a cross section dimension that is free of projections from said wing portion down to said bottom end thereof in order that said body portion can be inserted in key slots in said first member, said at least one wing portion being resilient and being shaped with respect to said body portion to deflect and exert a holding force on said first member when said body portion is disposed in said slot with said bottom end thereof forced against said second member, and there being aperture means in said body portion for receiving the nails therein to pivotally attach said wing headed fasteners to said second member in a manner that forces said at least one wing portion against said first member to removably attach said first member to said second member and to enable said wing headed fastener to pivot into registry with the key slots for removing said first member.

3. The wing headed fastener of claim 3 wherein said aperture means comprises a top portion that is countersunk to receive the head of a nail and a bottom portion that is countersunk to reduce the area of contact and and therefore the friction at the bottom of the fastener.

4. The wing headed fasteners of claim 3 wherein said means for interconnecting said wing headed fasteners comprise gate sections extending perpendicular to the body portion, and substantially normal to the at least one wing portion of said wing headed fasteners.

5. The wing headed fastener of claim 2 wherein said section of the top portion of said aperture means is countersunk, and wherein the bottom portion of said aperture means is substantially conically shaped whereby said bottom portion of said aperture means is non-contiguous with the received nail.

6. An improved process for attaching a slotted panel having a plurality of slots to a workpiece by means of apertured wing headed fasteners having a body portion with at least one of said wing portions projecting outwardly from said body portion, said wing headed fasteners attached to each other by integral interconnecting gate portions to form a strip of spaced apart wing headed fastener, said wing portions being resilient and being shaped to deflect and exert a securing force on said panel in the closed position of said fastener when said body portion is inserted in and forced against said workpiece, including the steps of:

pushing said strip to position one of said apertured wing headed fasteners for mounting on said workpiece, superimposing the panel on said workpiece, passing the body portion of each of said fasteners through each of said slots toward said workpiece, driving second fasteners through said apertures and into said workpiece to rotatably mount said wing headed fastener so that said body portions are forced against said workpiece, and cutting said gate portion on one side of said fastener and trimming said gate portion on the other side of the fastener while driving said second fastener through said aperture into said workpiece, whereby said wing portions are forced against said panel to secure said panel onto said workpiece when said wing headed fastener is in its closed position not in registry with said slot.

7. A strip of fasteners comprised of a plurality of wing headed fastener elements made of resilient material, arranged side by side with a thin narrow web integrally formed therewith to interconnect adjacent fasteners for providing a strip of the fasteners which feeds through a magazine of an automatic tool, each of said fastener element comprising a barrel-like body having at least one diametrically arranged wing extending from a top end thereof, the body being free of projections other than said wing extension.

8. A strip of fasteners comprised of a plurality of wing headed fastener elements made of resilient material, arranged side by side with a thin narrow web integrally formed therewith to interconnect adjacent fasteners for providing a strip of the fasteners which feeds through a magazine of an automatic tool, each of the fastener elements including a body having an axial opening therethrough.

9. A strip of fasteners comprised of a plurality of wing headed fastener elements made of resilient material, arranged side by side with a thin narrow web integrally formed therewith to interconnect adjacent fasteners for providing a strip of the fasteners which feeds through a magazine of an automatic tool, the fastener elements and web being integrally formed from a plastic material, each fastener element comprising a central barrel-like body with an axially aligned opening therein and having diametrically opposed wings on one end of said barrel, said wings extending substantially perpendicular to the axis of said opening, and said web comprising a thin and narrow sheet of material substantially perpendicular to the wings and axis of said openings.

10. An improved process for attaching a panel to a work piece comprising the steps of:

inserting a plurality of nails into a first magazine in a tool, inserting a plurality of fastening elements into a second magazine in said tool, pushing said nails and said fasteners toward a working area of said tool, aligning one of said nails with one of said fastening elements stationed in said working areas, positioning said aligned nail and fastener over a work piece, and driving said one nail through said one fastener and into said work piece.

* * * * *